United States Patent [19]

Morse

[11] Patent Number: 4,834,558

[45] Date of Patent: May 30, 1989

[54] SPRING-LOADED PLATEN ROLLERS

[75] Inventor: Milton Morse, Fort Lee, N.J.

[73] Assignee: Nena Morse, Cliffside Park, N.J.

[21] Appl. No.: 786,674

[22] Filed: Oct. 11, 1985

[51] Int. Cl.[4] ................................ F16C 27/08

[52] U.S. Cl. ................................ 384/54; 100/918; 193/35 B; 384/58; 425/193; 425/406; 425/411

[58] Field of Search ..... 425/406, 411, 413, DIG. 117, 425/DIG. 118, 186, 193; 72/448, 446; 100/224, 229 R, 918; 308/3 A, 6 R; 193/35 MD, 35 B, 37; 16/97, 98, 100, 104; 414/530; 384/54, 58

[56] References Cited

U.S. PATENT DOCUMENTS

| | | | |
|---|---|---|---|
| 1,381,188 | 6/1921 | Gury | 308/3 A |
| 2,077,189 | 4/1937 | Rishel | 193/35 B |
| 2,367,525 | 1/1945 | Rempel | 425/406 |
| 2,617,509 | 11/1952 | Britton | 193/35 B |
| 2,988,330 | 6/1961 | Allison | 254/98 |
| 4,301,673 | 11/1981 | Yonezawa | 100/918 |
| 4,317,358 | 3/1982 | Yonezawa et al. | 100/918 |
| 4,528,903 | 7/1985 | Lerch | 100/918 |
| 4,553,795 | 11/1985 | Takagi | 308/6 R |

*Primary Examiner*—Jan H. Silbaugh
*Assistant Examiner*—Jill L. Heitbrink
*Attorney, Agent, or Firm*—Weingram & Zall

[57] ABSTRACT

Spring-loaded rollers for a mold have an axle mount which passes through the roller into a supporting portion of the seats in the platen to prevent the roller from rotating, twisting or otherwise moving in the set, thereby reducing wear in the roller assemby and in the mold. The roller assembly is easily removed from its seat through the use of a removal device cooperating with screw threads in the roller. A plurality of rollers are used to permit a mold to be easily moved into and out of position in a press. The mold is thus mounted in position since the rollers limit the ability of the mold to move laterally.

2 Claims, 3 Drawing Sheets

SPRING-LOADED PLATEN ROLLERS

BACKGROUND OF THE INVENTION

1. Field of the Invention

This invention relates to a mold-supporting arrangement in molding machines and specifically to molding machines used to mold rubber. Though disclosed in connection with the molding of rubber, the invention is applicable to the molding of other materials as well.

2. Description of the Prior Art

U.S. Pat. Nos. 4,459,909 to Takagi; 4,301,673 to Yonezawa; and 4,317,358 to Yonezawa et al, each disclose a molding press machine which includes roller arrangements to permit the molds or dies to be transported smoothly into and out of the press with a minimum of effort and a minimum of damage to the press. Applicant recognizes that in the usual rubber molding procedures, the molds are first loaded with rubber and then pushed into the molding press. The press is closed, the mold compressed, and, after curing, the press is opened and the mold withdrawn. In the larger presses, the molds are heavy and cumbersome to handle. Sliding the molds into and out of the press causes scoring, galling, and denting to the upper surface of the bottom platen of the press and to the undersurface of the mold. As disclosed in the aforementioned United States patents, the molds are more easily moved with reduced damage if load bearing units such as rollers or ball bearings are employed.

As noted in the Yonezawa et al, U.S. Pat. No. 4,317,358, the problems associated with die lifters which incorporate spring-loaded balls supported by heavy duty springs include: (1) the scoring and engraving of the mold by the ball surface; (2) undesired play between the mold and the platen; and, (3) drift of the balls in their supporting holes. The solutions to these problems proposed by Yonezawa et al are complex arrangements.

Further, the roller balls disclosed in these patents permit the mold to move laterally as the balls themselves can rotate in all directions.

SUMMARY OF THE INVENTION

Applicant forms apertures in the lower platen of the press each aperture being capable of receiving a load-bearing unit in the form of a spring-loaded roller wheel which projects approximately one-sixteenth inch above the top surface of the bottom platen of the press. Spring-loaded roller wheels are inserted into all or less than all of the apertures in the mold plate. The number of rollers used will depend upon the type of mold to be moved in and out of the press. Use of a sufficient number and pattern of the spring-loaded roller wheels enables the mold to be rolled into and out of the press across the top of the bottom platen without scratching the top surface of the bottom platen of the press or the undersurface of the mold. This therefore adds to mold life as well as the life of the platen.

The load-bearing unit of applicant's invention is formed of an axle-mounted roller-wheel where a portion of the axle extends through the roller and beyond the periphery of the axle support. This extended axle portion interfits within a portion of the aperture in the platen into which the unit is inserted so as to limit the ability of the unit to rotate in the aperture or to develop undesired play as noted by Yonezawa et al. In addition, the roller employed by applicant does not score or engrave the mold in the undesired manner in which Yonezawa et al describe the spring-loaded ball arrangement.

Applicant's roller arrangement limits the ability of the molds to move in undesired directions as the rollers can rotate in only a forward and backward direction.

It is an object of the present invention to prolong the useful life or molds, and remove the necessity for regrinding the bottom platen of the press. A further object of the present invention to decrease "down time" in the molding operation due to the necessary repair and rework of the press and the molds. It is a further object of the present invention to enable more expeditious molding by providing ease in inserting and removing the mold from the press. Another object of the present invention is the provision of a mold insertion mechanism which does not require a power source or hydraulic pressure for actuation.

Another object of the present invention is the provision of a load-bearing unit incorporating a spring-loaded roller wheel which does not score or engrave the mold. Another object of the present invention is the provision of a spring-loaded wheel unit which does not develop lateral drift or "play".

Another object of the invention is the provision of a roller arrangement which limits the ability of the mold to move in undesired directions.

It is another object of the invention to provide a bearing unit incorporating a spring-loaded roller wheel which facilitates insertion and removal of molds from a press, and which reduces operator fatigue of workers responsible for inserting and removing the molds from the press.

Another object of the present invention is to extend the life of the mold and/or the platens by reducing the amount of scoring or wear associated with the insertion and removal of the mold and/or the platens.

Another object of the present invention is the provision of a spring-loaded device which can be easily removed once inserted into a platen.

DETAILED DESCRIPTION OF THE INVENTION

Figure 1:
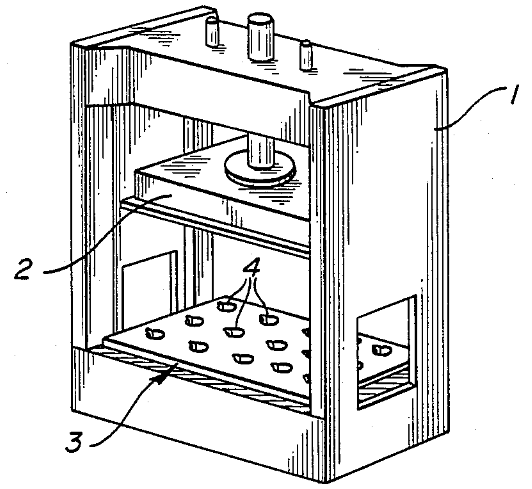
FIG. 1 is a schematic perspective view showing a press with a mold-supporting arrangement according to the invention.
Figure 2:
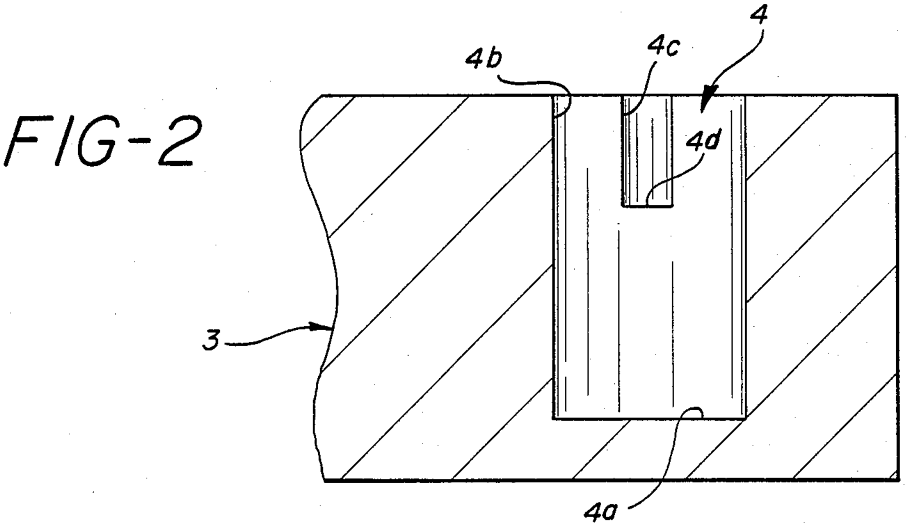
FIG. 2 is a cross section view of an aperture in the press platen.
Figure 2A:
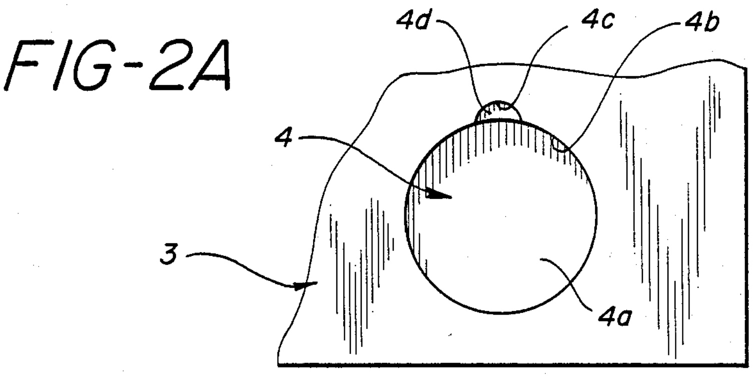
FIG. 2A is a top view of the aperture of FIG. 2.

FIG. 1 shows, generally, a molding press which incorporates a press ram 2, a machine frame 1, and a bottom platen, or bolster 3. As is known in the art, platen 3 will support a mold (not shown). Platen 3 has a plurality of spaced cylindrical seating holes 4 formed therein. As shown in FIG. 2, each of the holes 4 has a bottom wall 4*a* and a cylindrical internal wall 4*b* extending vertically from the bottom wall 4*a* to the upper surface of the platen 3. A plurality of spring-loaded roller units, as will be described hereinafter, are inserted as required in several of the apertures 4 in the bottom platen 3 in a desired pattern. The number of roller units and the pattern of placement thereof is determined in accordance with the weight and shape of the mold to be supported on platen 3. As shown in FIGS. 2 and 2A, the apertures 4 in lower platen 3 are cylindrical; however, they each have a small hemispherical section 4*c* formed therein at one side of the cylinder. Section 4*c* extends downward into platen 3 along internal wall 4*b* for approximately one-third of the depth of each cylindrical aperture 4. As will be later shown, the hemispherical section 4*c* supports a portion of the axle on which the spring-loaded roller is mounted, and also provides steadying support for the entire spring-loaded roller assembly so as to prevent same from rotating within the confines of cylindrical aperture 4.

Figure 3:
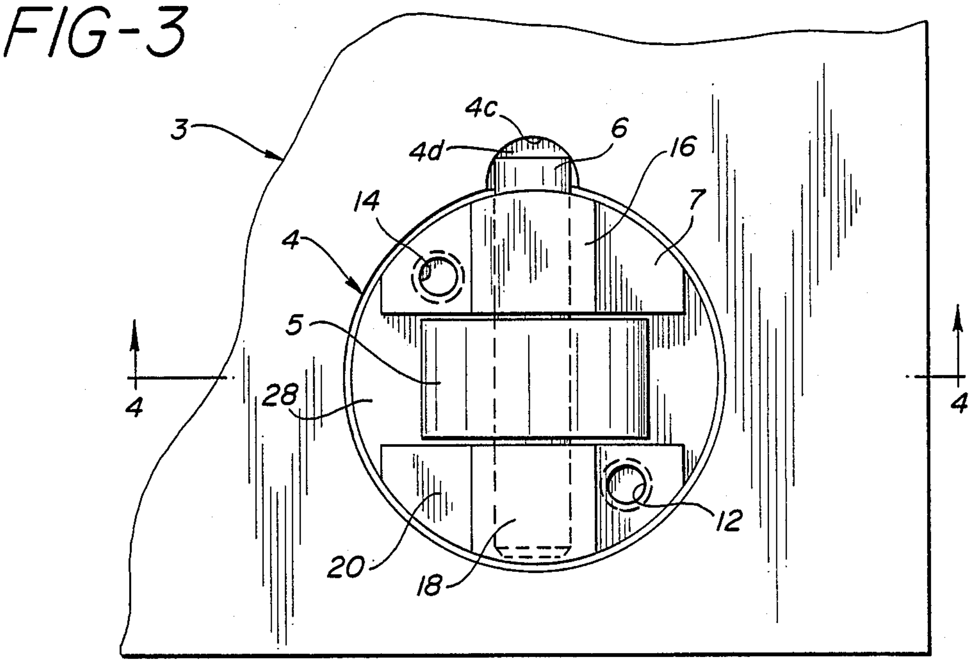
FIG. 3 is a top view of the load-bearing unit of the invention inserted into an aperture.

FIG. 3 is a top view of one of the spring-loaded roller mechanisms of the present invention as same is shown mounted in one of the cylindrical apertures 4 in platen 3. As indicated in connection with the description of FIGS. 2 and 2A above, the hemispherical portion 4*c* of aperture 4 is shown supporting a portion of axle 6 therein. As will now be understood, the location of axle 6 within and surrounded by hemispherical portion 4*c* limits the ability of the entire assembly from rotating and thereby from causing misalignment and developing of concurrent mold drift.

Numeral 5 denotes the roller which forms the main supporting part of the present invention. The roller 5 is mounted on axle 6 as shown in the section view in FIG. 4. Axle 6 is supported in axle mounts 7 and 20. These mounts each have raised portions, 16 and 18 respectively, which serve to provide strength to the entire assembly and to insure proper support of the load. Also shown in FIG. 3 are apertures 12 and 14 which are drilled into axle supports 20 and 7, respectively. These apertures are screw-threaded and provide the means by which the spring-loaded roller assembly is removed from aperture 4. Specifically, a threaded key shown generally at FIG. 5 is inserted in one or the other of the screw-threaded apertures 12 or 14, enabling the entire unit to be manually withdrawn.

Figure 4:
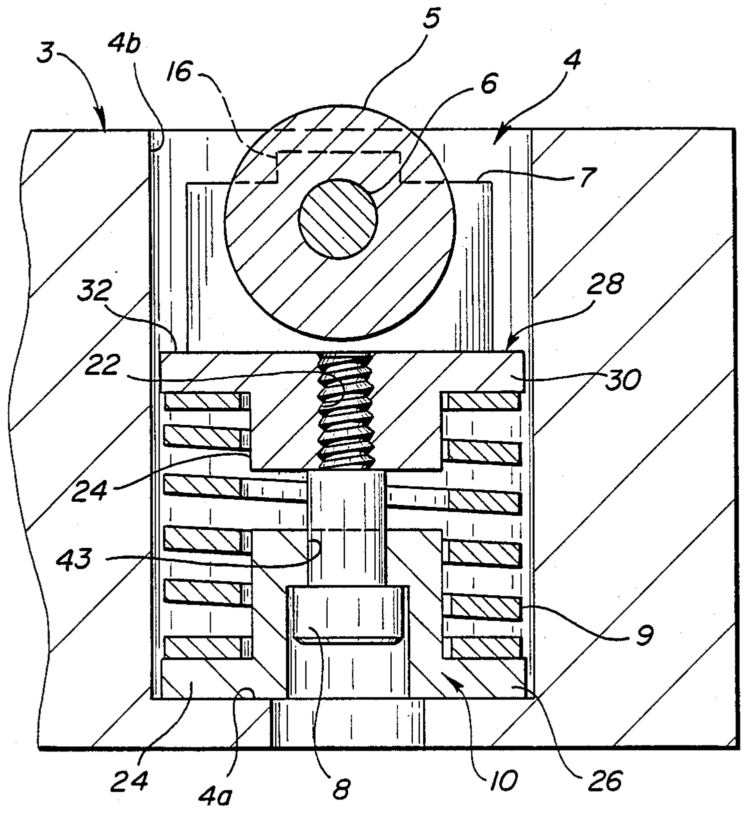
FIG. 4 is a side view, partially in section of the load-bearing unit of FIG. 3.

FIG. 4 is a side-view, partially sectioned, taken along the line 4—4 of FIG. 3. Numeral 5 denotes the roller which is in turn mounted for rotation on axle 6. Axle mounting supports 7 and 20 are shown having a bottom connecting portion 28 which connects and supports portions 7 and 20. A screw-threaded aperture 22 is formed at the bottom of portion 28. Aperture 22 in turn receives an assembly bolt 8 which, as will be later described, serves to compress the spring-loading feature of the present invention.

More specifically, a compression spring 9 is mounted between the connecting support 28 and a bottom support 10. Both the connecting support 28 and the bottom support 10 are cylindrical in shape and have complementary shaped legs 24, 26 for support 10 and 30, 32 for connecting support 28 formed thereon for supporting the ends of compression spring 9. As will now be apparent, assembly bolt 8 serves to hold bottom support 10 and connecting support 28 via screw-threaded aperture 22, all while placing spring 9 under compression. The entire arrangement, thus secured, is now capable of supporting a load which passes across the upper face of platen 3.

Figure 5:
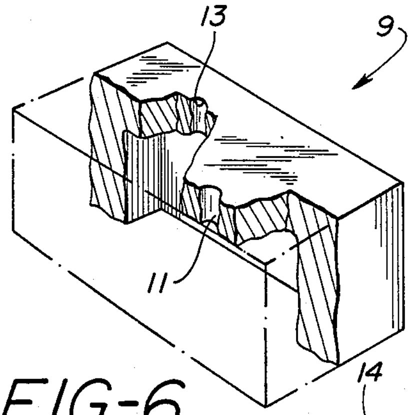
FIG. 5 is a perspective view of the cap portion of the tool used to remove the load-bearing units.

FIG. 5 shows the puller for the platen roller. The puller is used in the event the roller becomes wedged in its aperture or is otherwise difficult to remove manually because of dirt, etc. The puller fits over the roller assembly and rests on the face of the bolster 3 (FIG. 1). The puller utilizes two screws which are tightened into the roller assembly. The entire assembly is thus pulled up and out of the hole via the screws which loosen the roller assembly in its aperture. More specifically, in FIG. 5, a cap 9 has holes 11 and 13 drilled in the top surface thereof. These holes correspond in location to holes 12 and 14 in, for example, FIGS. 3 and 6. Cap 9 has an inner diameter which is slightly larger than the outer diameter of the aperture 4. The cap 9 is placed over an aperture 4 containing a spring-loaded platen roller of the invention. The outer walls of the cap rest on the bolster surface.

Figure 5A:
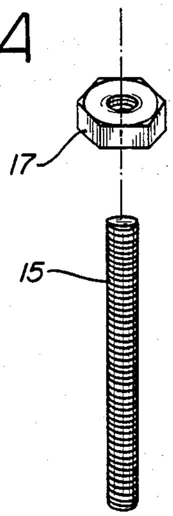
FIG. 5A is a side view of the screw portions of the tool of FIG. 5.

FIG. 5A shows a length of screw-threaded rod 15 and a corresponding nut 17. In practice, two of the rods 15 and the nut 17 are utilized after the cap is placed over aperture 4. Thus, the screw threads and the nuts are tightened into the apertures 12 and 14, thereby getting a lifting effect as the surface of the nut bears on the top surface of cap 9. In this manner, the screw threads act as a "jack" to loosen the rollers from the apertures as the roller is withdrawn out of the aperture and into the inner surface of cap 9.

Figure 6:
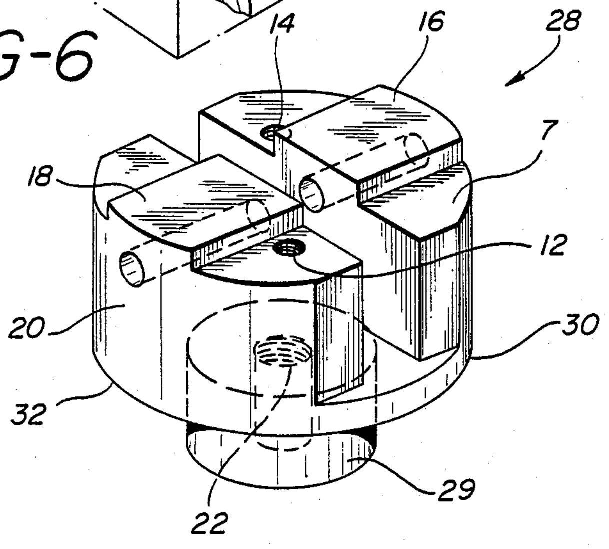
FIG. 6 is a perspective view of the axle support portion of the invention.

FIG. 6 is a perspective view of the axle support portion 28 of the load-bearing unit of the present invention. As shown in FIG. 6, portion 28 has two arms 7 and 20 for supporting axle 18. Portions 7 and 20 are mounted on reduced diameter portion 29, thereby forming a cylindrical shoulder surface 30, 32 for support of compression spring 9 (as shown in FIG. 4).

Screw threaded aperture 22 is formed in reduced diameter portion 29 for receiving assembly bolt 8 (FIG. 4).

Figure 7:
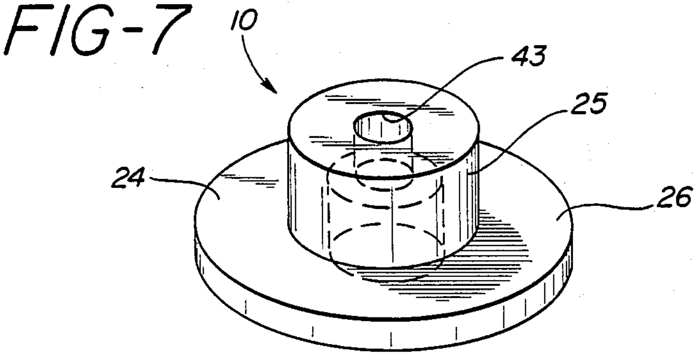
FIG. 7 is a perspective view of the bottom spring support of the invention.

FIG. 7 is a perspective view of the bottom portion 10 of the load-bearing unit. This portion forms a cylindrical surface 24, 26 for support of compression spring 9. Again, a reduced diameter cylinder 25 is formed on portion 10 to form the spring support surface 24, 26. Aperture 43 is formed in cylinder 25 to receive assembly bolt 8 (FIG. 4).

The present invention being thus described, it will be obvious that same may be varied in many ways. Such variations are not to be regarded as a departure from the spirit and scope of the present invention, and all such modifications, as would be obvious to unskilled in the art are intended to be included within the scope of the following claims.

What is claimed is:

1. A roller-bearing unit comprising:

a roller, an axle for centrally supporting said roller;

first and second axle supports connected to said axle;

a compression spring connected to said first and second axle supports;

a third support connected to said compression spring and to said axle supports;

a bolt for tightening said compression spring, said bolt connected to said axle support and to said third support; and said first axle support including a screw-threaded aperture therein for assisting in removing said unit; said screw-threaded aperture cooperating with a screw-threaded removal means engaging said aperture to withdraw said roller-bearing unit from a seating hole.

2. The unit of claim 2 wherein said screw-threaded removal means is, in turn, mounted in a removal device, said device including an inner volume capable of receiving said load-bearing unit, and an outer surface capable of supporting said screw-threaded means over a seating hole;

said device further including a screw-threaded aperture for engaging said screw-threaded means, said screw-threaded means extending through said aperture into the aperture of said load-bearing unit to draw said unit into the interior volume of said removal device.

* * * * *